Sept. 2, 1952     A. R. THOMPSON     2,609,079
FEED MECHANISM FOR PRESSURE COOKERS
Filed July 23, 1945     8 Sheets-Sheet 1
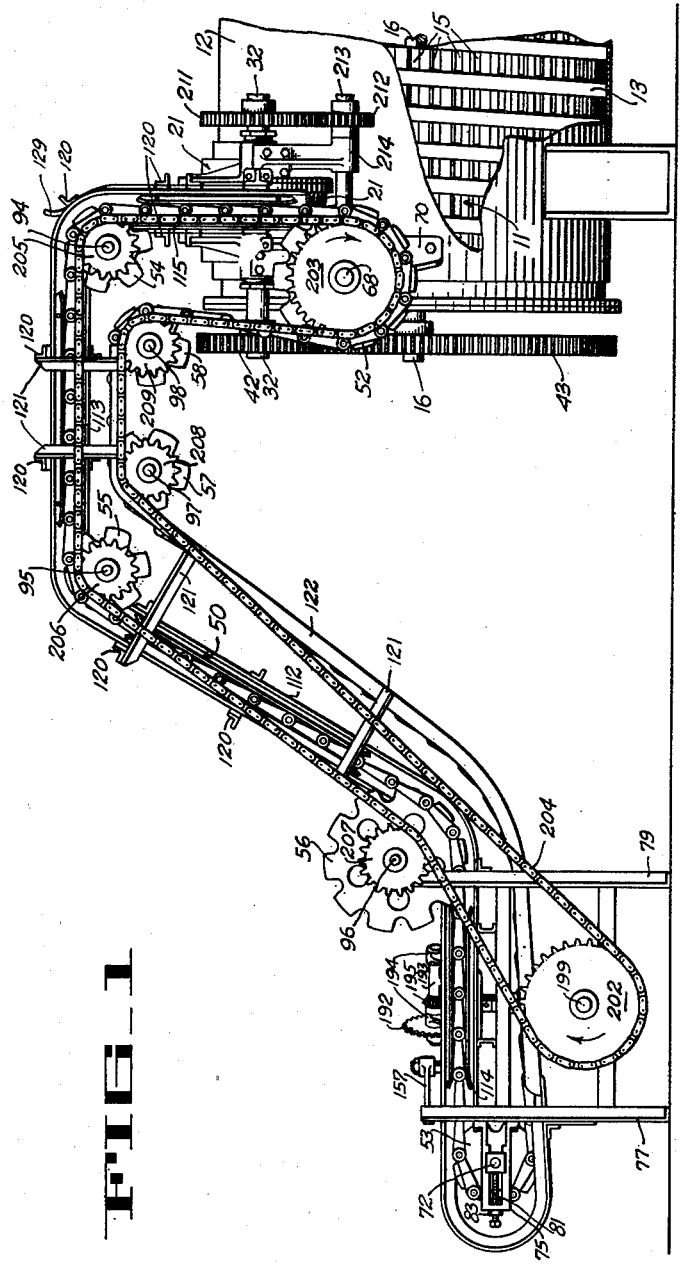
FIG_1
Inventor
ALBERT R. THOMPSON
By Philip A. Minnis
Attorney

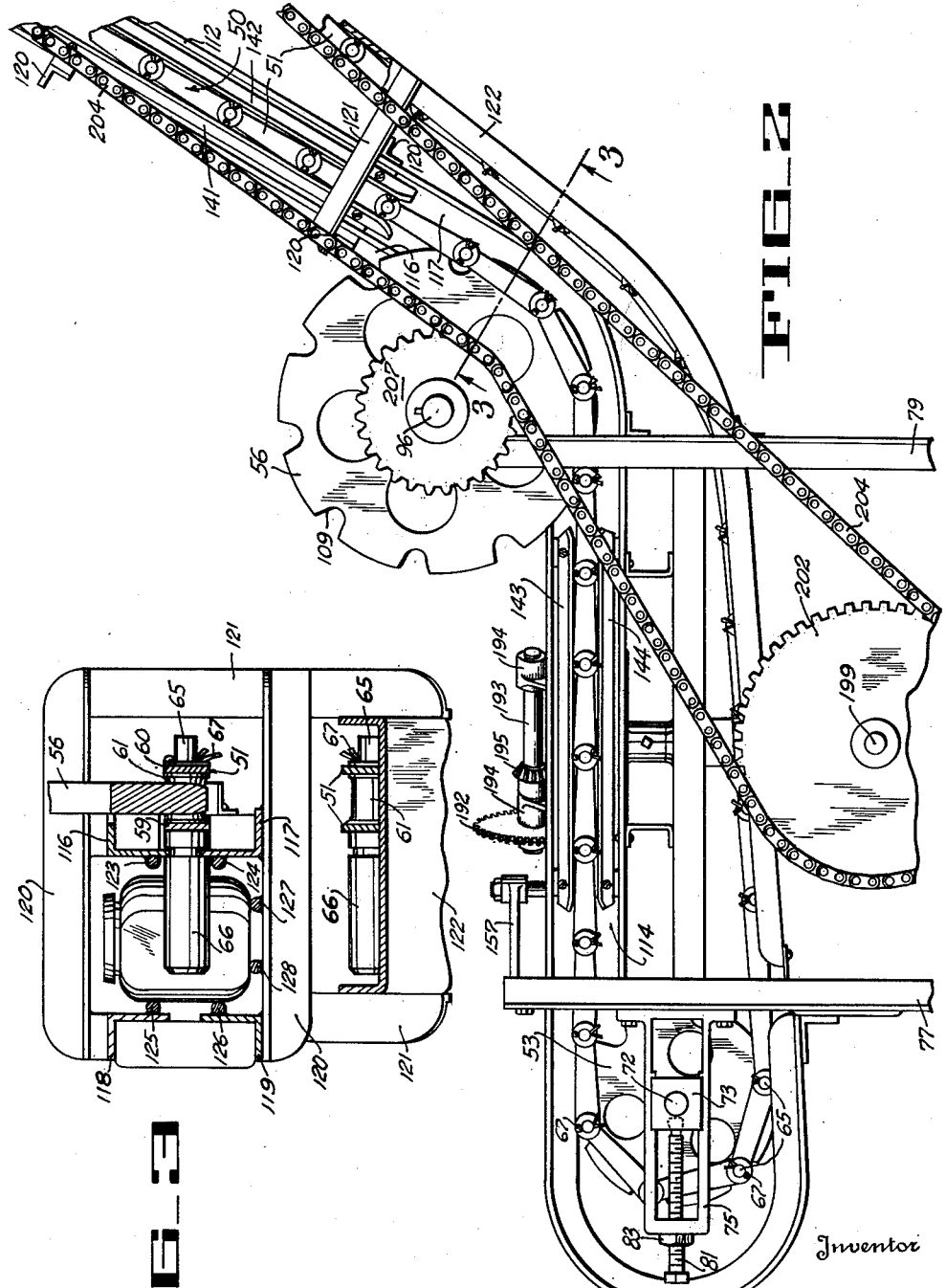

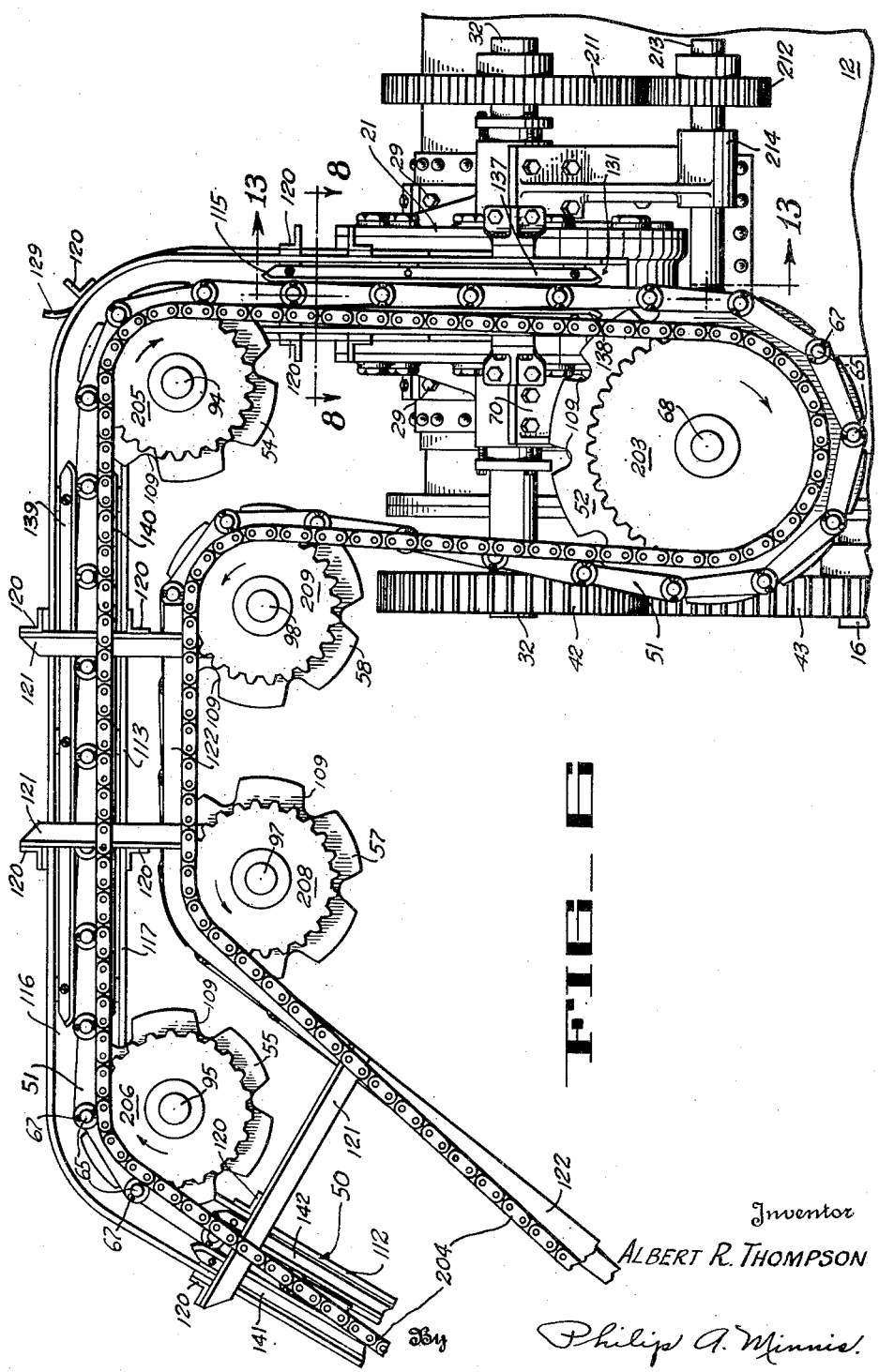

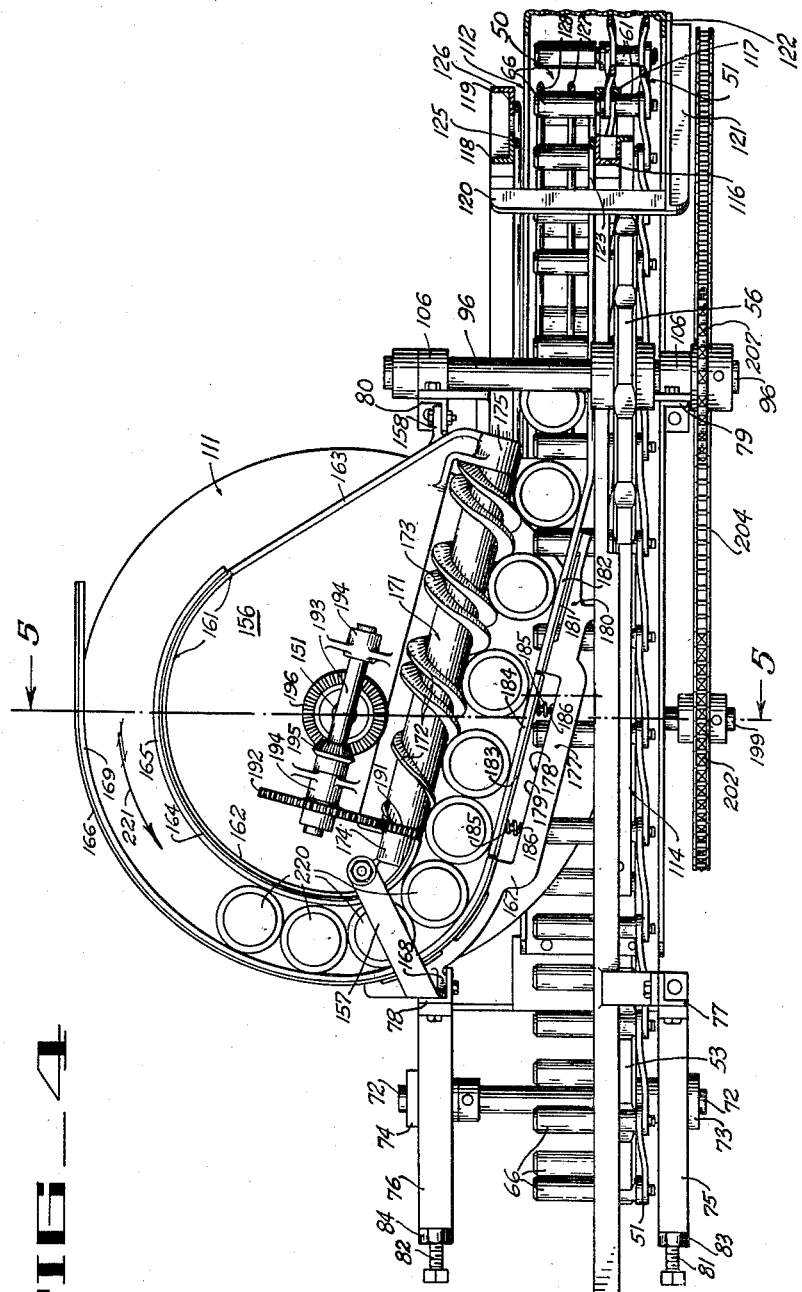

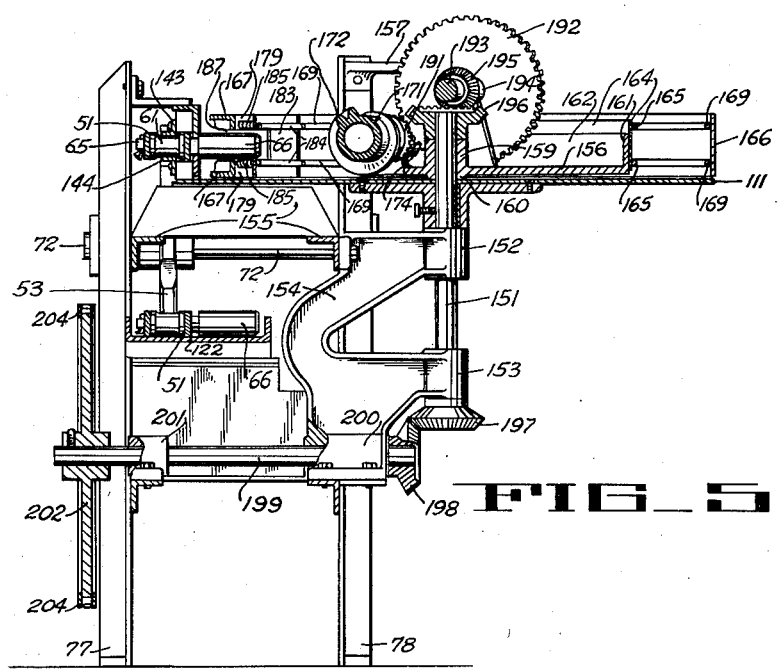
FIG_5
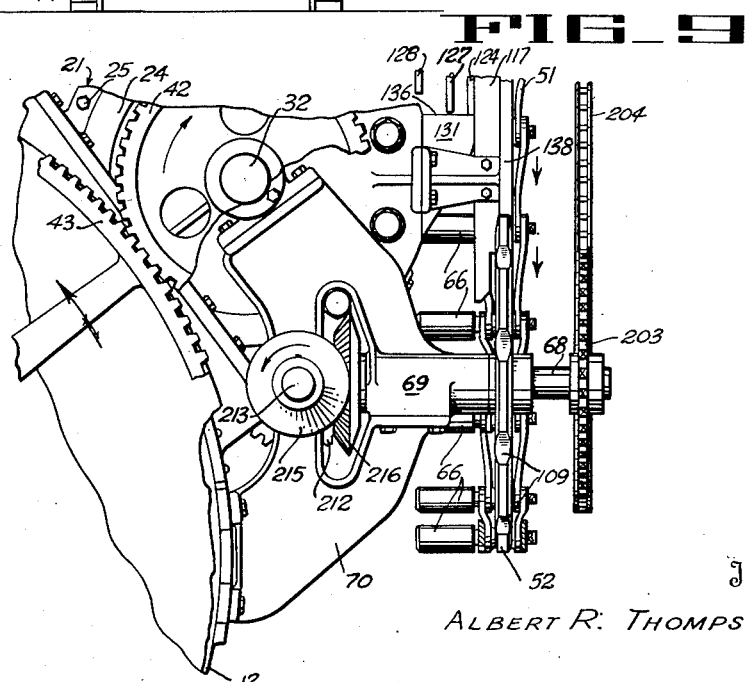
FIG_9
Inventor
ALBERT R. THOMPSON
By Philip A. Minnis
Attorney

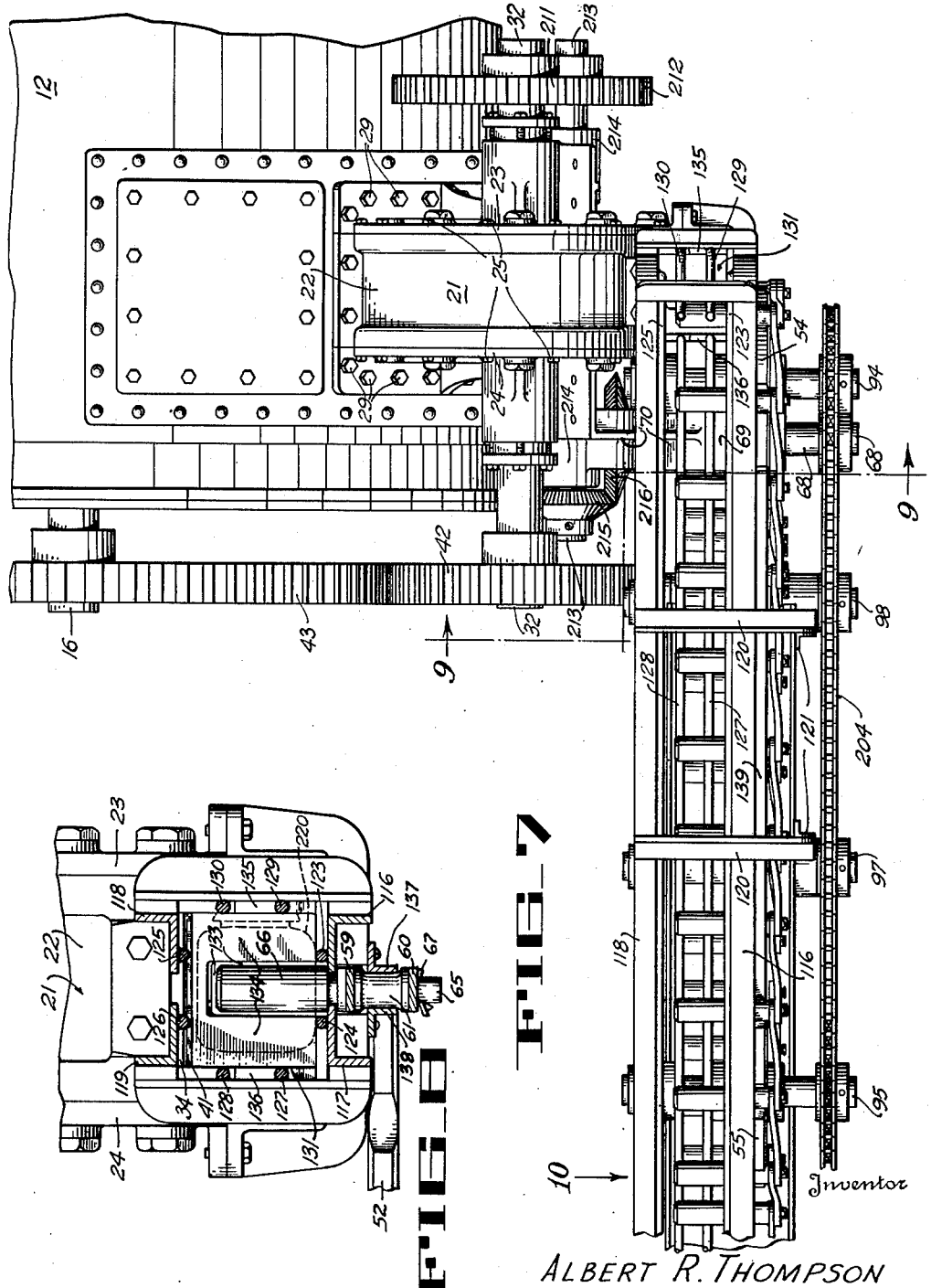

Sept. 2, 1952        A. R. THOMPSON        2,609,079
FEED MECHANISM FOR PRESSURE COOKERS
Filed July 23, 1945        8 Sheets-Sheet 7
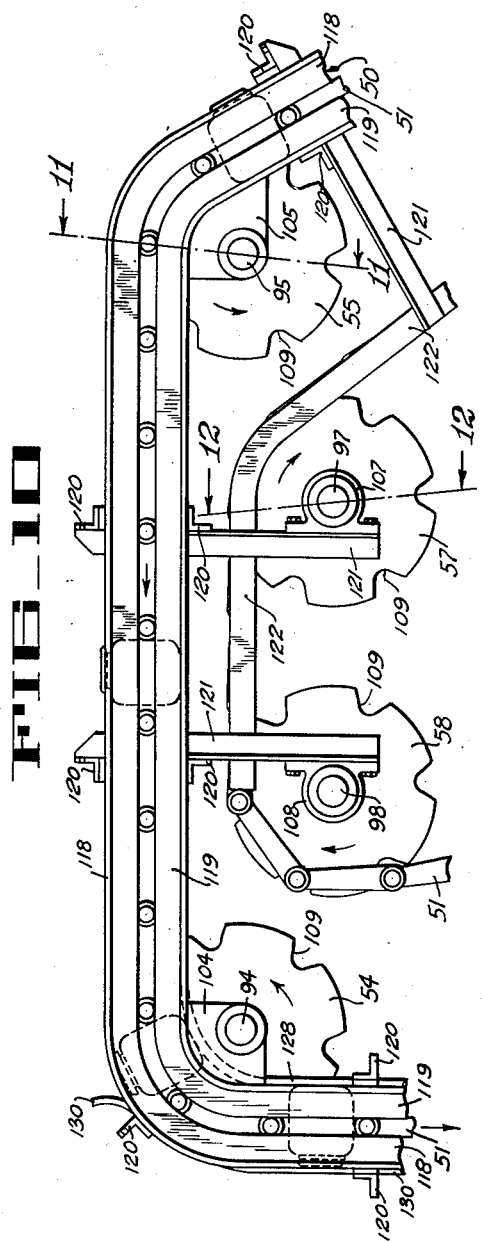
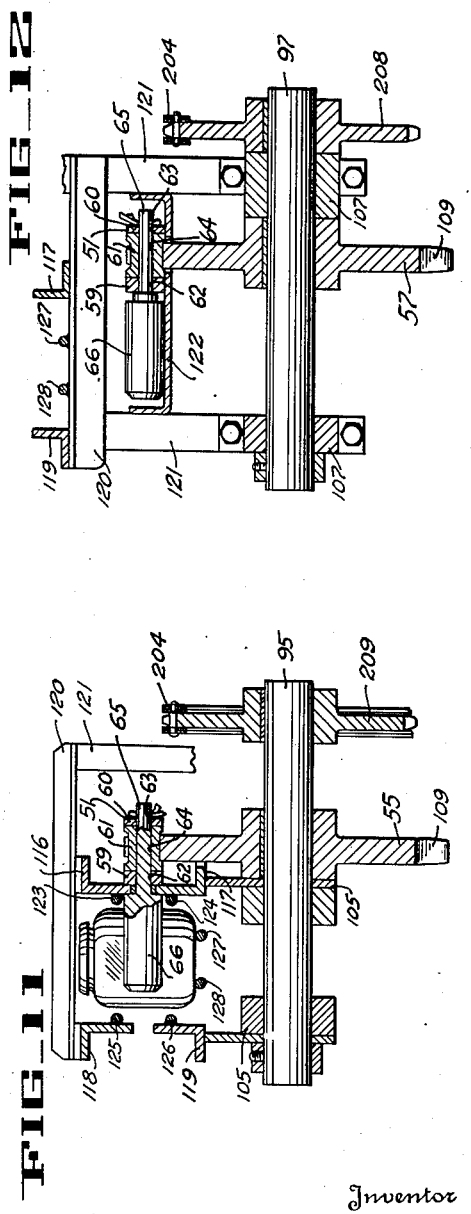
Inventor
ALBERT R. THOMPSON
By Philip A. Minnis
Attorney Sept. 2, 1952 — A. R. THOMPSON — 2,609,079
FEED MECHANISM FOR PRESSURE COOKERS
Filed July 23, 1945 — 8 Sheets-Sheet 8
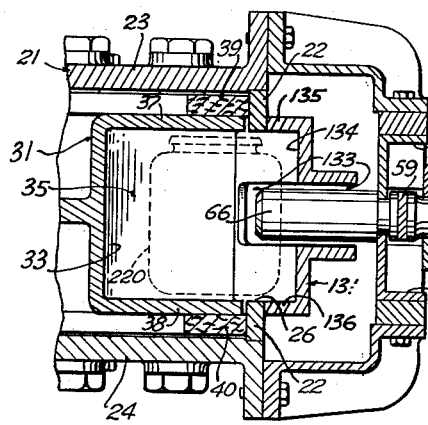
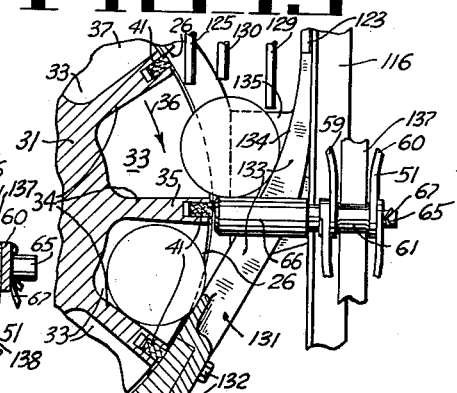
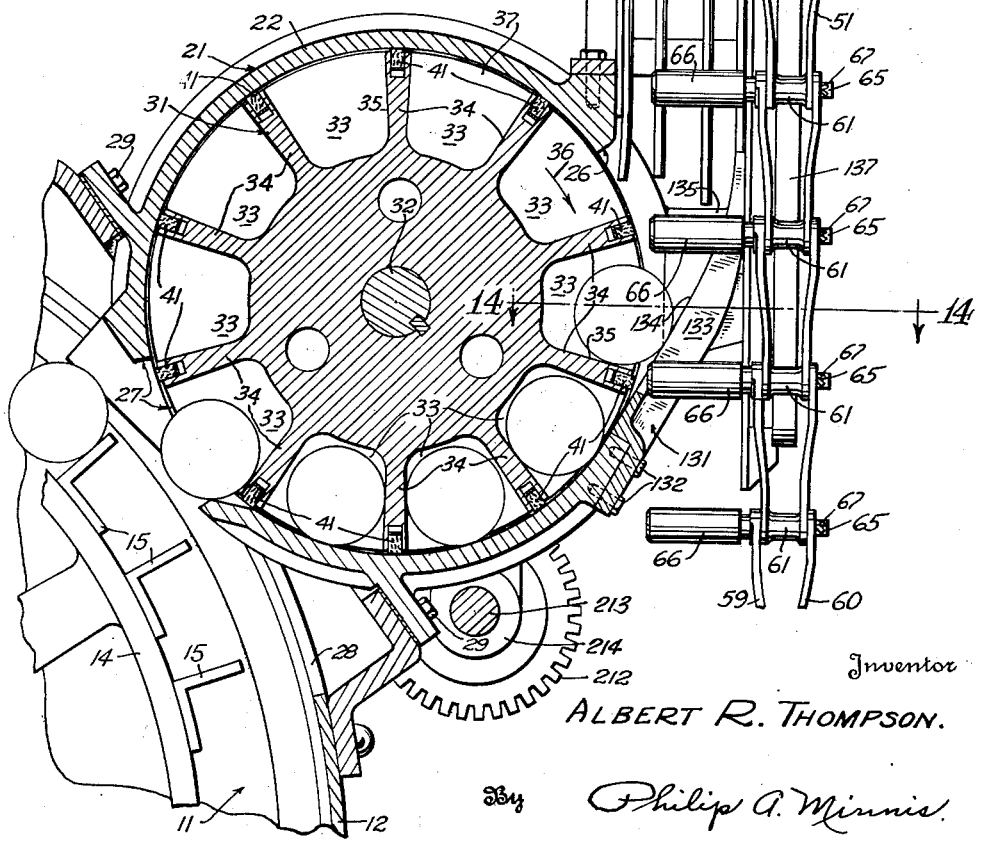
Inventor
ALBERT R. THOMPSON.
By Philip A. Minnis
Attorney Patented Sept. 2, 1952

2,609,079

UNITED STATES PATENT OFFICE 2,609,079

FEED MECHANISM FOR PRESSURE COOKERS

Albert R. Thompson, Los Gatos, Calif., assignor to Food Machinery and Chemical Corporation, a corporation of Delaware Application July 23, 1945, Serial No. 606,659

12 Claims. (Cl. 198—28)

This invention relates to apparatus for processing food products packed in containers, and is particularly concerned with feed mechanism for continuous canned goods cookers to adapt the same for handling frangible containers, such as glass jars and the like.

Heretofore it has been customary to introduce the containers into the cooking chamber of pressure cookers by means of a rotatable valve having pockets to which the containers are delivered by means of an endless conveyor operable to drop the containers, one at a time, into successive valve pockets as the valve is rotated.

One of the principal problems in processing food in glass jars is to handle the jars with sufficient gentleness to avoid breakage. Even if a shock resulting, for instance when the glass jars are dropped into the valve pockets from the conveyor, is not severe enough to break the glass at the time, it may weaken the glass or cause strains in the glass so that the jars break in the cooker when subjected to the cooking process. When this happens the jars and their contents are lost and the cooker has to be cleaned out from time to time, thereby reducing the production of the cooker an appreciable amount.

An object of the present invention is to provide an improved mechanism for feeding containers to pressure cookers and the like, in which the containers are handled gently and are gradually transferred from one part of the apparatus to another part without shock.

Another object of the present invention is to provide an improved mechanism for feeding containers, such as glass jars or the like, to moving receivers so that the containers are accurately and positively delivered to the receivers without damage or shock.

Another object of the present invention is to provide an improved mechanism for feeding glass containers to the feed valves of continuous cookers or the like which is gentle in operation, economically constructed, reliable and simple in operation and unlikely to need repair or replacement over long periods of time.

I attain these and other objects of the invention by the mechanism illustrated in the accompanying drawings, in which:

Fig. 1 is a side elevation of the inlet end of a cooker showing the feeding mechanism of the present invention applied thereto;

Fig. 2 is an enlarged side elevation of the lower portion of the structure shown in Fig. 1 where the containers are delivered to the feed mechanism;

Fig. 3 is a vertical transverse sectional view taken along the line 3—3 of Fig. 2;

Fig. 4 is a plan view of the structure shown in Fig. 2;

Fig. 5 is a vertical transverse sectional view taken along the line 5—5 of Fig. 4;

Fig. 6 is an enlarged side elevation of the upper portion of the structure shown in Fig. 1 where the containers are delivered to the cooker;

Fig. 7 is a plan view of the structure shown in Fig. 6;

Fig. 8 is a horizontal sectional view taken along the line 8—8 of Fig. 6;

Fig. 9 is a vertical transverse sectional view taken along the line 9—9 of Fig. 7;

Fig. 10 is a detail side elevation of a portion of the structure shown in Fig. 7, looking in the direction of the arrow 10;

Fig. 11 is a vertical transverse sectoinal view taken along the line 11—11 of Fig. 10;

Fig. 12 is a vertical transverse sectional view taken along the line 12—12 of Fig. 10;

Fig. 13 is a vertical transverse sectional view taken along the line 13—13 of Fig. 6;

Fig. 14 is a sectional view taken along the line 14—14 of Fig. 13; and

Fig. 15 is a view of a portion of the structure shown in Fig. 13 showing the conveyor and valve turret in another position.

Referring to Figs. 1 and 13 of the drawings, the conventional form of cooker comprises a cooking chamber 11 formed of a hollow cylindrical shell 12 closed at its ends. Since these cookers are well known in the art, only the portion of the cooker at the inlet or the end through which the containers are delivered to the chamber 11 for processing is shown. As is customary in these cookers, the interior wall of the shell 12 is provided with a continuous spirally arranged guide rail 13 which forms a helical pathway for guiding the containers from the inlet to the outlet of the cooker. A reel, made up of a plurality of spider wheels 14, provided with L-shaped rails 15, is mounted upon a rotatable shaft 16, longitudinally extending through the chamber 11.

The containers are delivered into the cooker by means of a feed valve device 21 comprising a casing having a cylindrical wall 22 and end walls 23 and 24 which are detachably secured to the cylindrical wall 22 by means of bolts 25, as shown in Fig. 7. The cylindrical wall 22 of the feed valve casing is formed with an inlet port or opening 26, and outlet port or opening 27. The outlet opening 27 is disposed in registry with an opening 28 provided in the shell 12 of the cooker, as shown in Fig. 13. The feed valve casing as a unit is secured to the shell 12 by means of bolts 29, as shown in Figs. 6, 7 and 13.

A valve turret 31 mounted on a shaft 32, rotates within the casing of the feed valve 21. The turret 31 has a series of pockets 33 formed in the periphery thereof for receiving the containers and for successively feeding them through the outlet opening 27 onto the L-shaped rails 15 of the reel within the chamber 11. The pockets 33 are separated by radially disposed walls 34, and have a container supporting surface 35 that moves downwardly past the inlet opening 26 during rotation of the turret in the direction of the arrow 36, as shown in Fig. 13.

The width of the turret 31 is less than the overall width of the casing of the feed valve 21, so that the end walls 37 and 38 of the pockets 33 are spaced from the walls 23 and 24, respectively.

For the purpose of sealing the joints between the rotatable turret 31 and the casing of the feed valve 21, sealing rings 39 and 40 are disposed in the space between the turret and the casing, in the manner shown best in Fig. 14, and sealing members 41 mounted in the transversely extending radial walls 34 establish a seal between adjacent pockets 33 of the valve and the interior surface of the wall 22 of the feed valve casing.

In cookers of the type herein shown, the feed valve turret is rotatable about a horizontal axis, and in the present instance the inlet port or opening 26 is located in the wall 22 of the casing 21 at a point substantially in alignment with a line passing in a horizontal plane through the axis of rotation of the turret. This arrangement of the inlet opening 26 with respect to the axis of the valve turret 31 is somewhat different than has been the practice heretofore. In the cookers of the prior art to which the present invention is applicable, it was usually the custom to locate the inlet opening at some point in the casing of the feed valve above the axis of the turret, so that containers delivered by the conveyor to the feed valve would drop by gravity into the pockets of the turret as the pockets successively registered with the inlet opening during rotation of the turret. Since, according to the present invention it is the purpose to introduce the containers into the pockets of the turret without dropping the containers into the pockets, the inlet opening 26 has been arranged in the side of the feed valve casing at a point where the containers will roll into the pockets of the turret.

As shown in Figs. 1, 6, 7 and 9, the shaft 32 of the feed valve turret 31 is provided with a gear 42 keyed thereto and having its teeth in meshing relationship with the teeth of a gear 43 keyed to shaft 16. Shaft 16 is driven in well known manner from a suitable source of power (not shown) and from said driven shaft and gear 43, power is derived for driving all units of the mechanism of the present invention, in the manner to be hereinafter described.

The conveyor 50 (Figs. 2 and 6) comprises a single endless chain 51 traveling around end sprockets 52 and 53 and guided and supported by intermediate sprockets 54, 55, 56, 57 and 58, which are arranged at salient points in the supporting framework of the conveyor, as will be hereinafter more fully described.

The chain 51 is composed of a series of similarly formed U-shaped links (Fig. 13), each comprising side members or legs 59 and 60 connected at one end by a cross member or spacing sleeve 61. As shown in Fig. 11, the outer ends of the side members or legs 59 and 60 of each link are formed with openings 62 and 63, respectively, and the cross member or spacing sleeve 61 has an opening 64 bored lengthwise thereof. The links are assembled end to end, with the openings 62 and 63 aligned with the openings 64 of the sleeves 61. Mounted in each set of aligned openings 62, 63 and 64 is the reduced portion 65 of a stud or pin 66 which projects laterally from the chain 51 a suitable distance. Due to the manner in which the links of the chain are constructed, the studs 66 will be rigidly supported by the chain at each pivotal connection of its links, said studs being spaced apart uniformly throughout the entire length of the chain so as to receive between them the containers or glass jars to be delivered to the cooker. The studs 66 are retained in position in the links of the chain by means of cotter pins or similar elements 67.

The sprocket 52 is fixed to a shaft 68 rotatably mounted in a bearing 69 carried by a bracket 70 fixed to the shell 11 of the cooker in proximity to the feed valve 21, as shown in Figs. 1, 6, 7 and 9.

The sprocket 53 (Figs. 1, 2 and 4) is fixed to a shaft 72 rotatable in bearings 73, 74, mounted for movement lengthwise of brackets 75, 76 attached to legs 77, 78, respectively, at the feed end of the frame of the machine. Legs 79 and 80 are also provided, in addition to the legs 77, 78, for supporting the feed end of the frame of the machine. The bearings 73, 74 are adapted to be positioned in the brackets 75, 76, respectively, so as to take up slack in the chain 51. Fixed to the bearings 73, 74 by any suitable means, such as by ball and socket connections, are the inner ends of threaded rods 81, 82 which are adapted to be rotated with respect to said bearings. The rods 81, 82 extend through threaded openings in the outer ends of the brackets 75, 76, respectively, and have their outer ends formed to receive a wrench or other suitable tool, by which the rods can be turned. The threaded rods 81, 82 are adapted to be turned with respect to the bearings 73, 74, respectively, so as to effect rectilinear movement of said bearings in the brackets 75, 76, respectively, either toward or away from the legs 77, 78. When the bearings 73, 74 have been positioned in the brackets 75, 76, respectively, so that the chain 51 has the desired tautness, the rods 81, 82 are held in position in the brackets by means of lock nuts 83, 84, respectively.

As shown in Figs. 1, 2, 6, 7, 10, 11 and 12, the sprockets 54, 55, 56, 57 and 58 are respectively mounted on shafts 94, 95, 96, 97 and 98, said shafts being rotatably mounted in bearings carried by brackets 104, 105, 106, 107 and 108, respectively, fixed to the framework of the conveyor. A series of notches 109 are formed in the peripheries in the sprockets 52, 53, 54, 55, 56, 57 and 58 for receiving the spacing sleeves 61 of the chain links.

After the containers or glass jars have been filled and capped they are delivered or conveyed in an upright position to a table 111. The table 111 has means associated therewith, as will be hereinafter described, for feeding the containers to the conveyors in predetermined spaced relation, so that only a single container will be fed from the table into the space provided therefor between each of the studs or pins 66 of the chain 51.

As shown in Fig. 13 the containers are adapted to be discharged from the conveyor into the pockets 33 of the valve turret 31 on their sides or in a substantially horizontal position. Therefore, in order to present the containers to the pockets 33 in such horizontal position, the conveyor is formed, as shown in Fig. 1, with an inclined section 112 which extends upwardly at an angle from a point adjacent to the table 111 to a point above the shell 11 of the cooker, where there is formed a substantially horizontal section 113. The horizontal section 113 of the conveyor includes the portion of the conveyor between the sprockets 54 and 55 and the inclined portion 112 includes the portion of the conveyor between the sprockets 55 and 56. Between the sprockets 53 and 56, the conveyor has a horizontal section 114 which is arranged along one side of the table 111, as shown in Fig. 4. The portion of the conveyor in proximity to the feed valve 21 includes a vertical section 115 (Fig. 1) which extends downwardly from the end of the horizontal section 113, in which the sprocket 54 is located, to the portion of the conveyor in which the sprocket 52 is located. The vertical section 115 (Fig. 13) of the conveyor is disposed tangentially with respect to the periphery of the feed valve 21, the studs 66 of the chain 51 being in proximity to the periphery of the valve turret 31.

Associated with the chain 51 and constituting a part of the conveyor 50, is a trackway for the containers comprising a plurality of angles 116, 117, 118 and 119, which are arranged substantially in the form of a rectangle, as shown in Fig. 11, with the opposed legs of the angles 116, 117 aligned with each other and spaced apart to provide a guideway lengthwise of the conveyor for the reduced portions 65 of the studs 66. The construction and arrangements of the parts is such that the portion 65 of each stud is made of sufficient length to accommodate the portions 59, 60, and 61 of the links of the chain and to extend also through the space between the legs of the angles 116, 117. Lateral movement of the chain 51 with respect to the trackway in either direction is prevented, since the chain is held in position relative to the trackway by the inner ends of the studs 66 which abut one face of the legs of the angles 116, 117 and the face of the legs 60 of each link which abuts the other face of the legs of said angles.

The angles 118 and 119 are arranged similarly to the angles 116 and 117 and have their opposed legs spaced apart so that the trackway is symmetrical in cross section. Due to the manner in which the angles 116, 117, 118 and 119 are arranged, the upper and lower portions of the trackway have outwardly projecting flanges to receive cross pieces 120 (Figs. 1, 3, 6, 7, 10, 12) for connecting said angles together. The angles 116, 117, 118 and 119 are also connected by pieces 121 which are arranged on the outside of the framework of the conveyor and are disposed at right angles to the pieces 120.

As shown in Figs. 1, 4, 6, 8 and 12, also mounted in the framework of the conveyor and supported from the members 121 is a channel-shaped member 122 which extends from a point adjacent to the sprocket 58 downwardly to a point in proximity to the table 111 so as to provide a support for the lower flight or run of the chain 51.

Secured to the angles 116, 117, 118 and 119 are rods 123, 124, 125 and 126, respectively. Also forming a part of the trackway is a pair of rods 127 and 128. The rods 123 to 128, inclusive, are to provide guide rods or rails for supporting the containers on the conveyors, the rods 127, 128 supporting the containers during passage of the containers from the table 111 to the end of the horizontal section 113 directly over the feed valve 21. From the portion of the section 113 of the conveyor directly over the feed valve 21 and down the vertical section 115, the rods 127, 128 function as guides. Throughout their length the rods 123, 124, 125 and 126 provide guides for limiting lateral or endwise movements of the containers in the trackway.

The rods 123 to 128 inclusive, are preferably made of round stock so as to present a surface of small area to the surfaces of the containers which come into contact with said rods, to thereby reduce the frictional engagement of the containers with the trackway to a minimum. The rods 123 to 128 inclusive, are coextensive with the length of the trackway from the table 111 to the feed valve 21, and as shown in Fig. 8, in order to retain the containers in position in the trackway during the passage of the containers down the vertical section 115 of the conveyor, additional rods or rails 129 and 130 are mounted in the trackway. Thus, the portion of the trackway extending from the table 111 to the end of the horizontal section 113 above the feed valve 21 is open at the top, having guide rails at the bottom and at the two sides only, and the remaining portion of the trackway extending down the vertical section 115 has guide rails arranged at all four sides thereof.

At a point adjacent to the feed valve device 21, the rods or guide rails terminate so as to provide an opening in the trackway to permit the containers to be transferred from the conveyor to the valve turret 31.

In order to effect such transfer of the containers, a guide member 131 is provided as shown in Figs. 13, 14 and 15. The guide member 131 comprises a rigid casting having its lower end fixed by bolts 132 to the exterior of the casing of the feed valve 21 at a point adjacent to the lower end of the inlet opening 26. The main body of the guide member 131 extends upwardly and outwardly from the feed valve casing and terminates adjacent to the chain 51 at a point approximately in alignment with the upper end of the inlet opening 26. Since the member 131 is rigid and extends obliquely across the path of the studs 66 of the chain 51 travel, said member is formed with an elongated slot 133. The slot 133, which is disposed substantially along the longitudinal center line of the member 131, has a width greater than the maximum diameter of the studs 66 so as to permit free passage of the studs through the member.

As shown in Fig. 13, the member 131 is formed with a container engaging surface 134 which extends from the guide rods 123 and 124 downwardly across the lower portion of the conveyor to the lower edge of the inlet opening 26, the upper portion of said surface being arcuate and the lower portion of said surface being substantially straight. The member 131 is non-flexing and the contour of its surface 134 is such that each container, as it approaches the inlet opening 26, is positively cammed laterally toward a pocket 33 of the turret 31 as the pocket moves into registry with the inlet opening 26, in the manner to be hreinafter more fully described.

The body of the member 131 above the portion that is attached to the feed valve casing is formed with upwardly extending side flanges 135 and 136 (Figs. 13 and 14) which align substantially with the end walls 37 and 38 respectively, of the pockets 33 of the turret 31. The width of the inlet opening 26 also corresponds substantially to the width of the pockets between the walls 37 and 38 and the width of the member 131 between the flanges 135 and 136 so that when a pocket is in registry with the inlet opening 26, a clear smooth channel will be provided, through which channel a container is adapted to freely pass when being transferred from the conveyor to the feed valve 21. As shown in Fig. 14, this channel has an overall width slightly greater than the length of a container, it being noted that the containers travel through the channel while disposed in a horizontal position or lying on their sides. By constructing the channel with a width slightly greater than the length of the containers, sufficient space at both ends of the containers will be provided so that the containers can travel toward a pocket in the valve turret without interference. However, the width of the channel should not be of such extent that the containers will tip or cant endwise and become lodged at an angle with respect to the walls of the channel. As shown in Fig. 13, the flanges 135 and 136 only extend part way up the main body of the member 131, said flanges terminating at a point adjacent to the lower ends of the rods 129 and 130.

As shown in Figs. 1, 2 and 6, between the sprockets 52 and 54, the framework of the conveyor is provided with a pair of guide members 137 and 138. A second set of guide members 139 and 140 are mounted on the framework of the conveyor between the sprockets 54 and 55. A third set of guide members 141 and 142 are mounted on the framework between the sprockets 55 and 56; and a fourth set of guide members 143 and 144 are mounted on the framework between the sprockets 53 and 56.

Each set of guide members 137, 138, 139, 140, 141, 142 and 143, 144 comprises a pair of parallel angles arranged in suitable spaced relation and presenting surfaces to receive between them the portion of the conveyor chain 51 defining the spacing sleeves 61 of each link. The purpose of the guide members is to retain the chain 51 in position on the conveyor and the manner in which the guide members provide tracks for supporting the chain is shown best in Figs. 5 and 8.

As shown in Figs. 4 and 5, the table 111 is mounted for rotation on a vertical shaft 151 supported in bearings 152 and 153, carried by a bracket 154 fixed to a suitable frame 155 which is supported from the floor by the legs 77, 78, 79 and 80.

Disposed above the table 111 is a bracket having a main body 156 which is spaced a slight distance from the upper surface of the table and which covers a large area of the table. The bracket 156 is secured to the legs 78 and 80, as indicated at 157 and 158, respectively, Fig. 4.

Upstanding from the body 156 of the bracket, is a tubular boss 159 through which the upper end of the shaft 151 projects, said shaft being rotatable in said boss. A boss 160, formed on the underside of the body 156 in alignment with the boss 159, rests on the top of the table 111 so as to space the bracket from the table.

The periphery of the body 156 of the bracket is formed with an upstanding flange 161 which is arcuate for a portion of its length, as indicated at 162, and substantially straight for a portion of its length, as indicated at 163, Fig. 4.

The flange 161 provides means for supporting a sheet metal strip 164 which is arranged perpendicular to the upper surface of the table 111 and constitutes a guard. The guard 164 is not coextensive with the length of the flange 161, terminating at one end at a point adjacent to the junction of the arcuate portion 162 with the straight portion 163 of said flange. The outer surface of the guard strip 164 has mounted lengthwise thereon a pair of rods 165, the purpose of which will hereinafter be described.

A second guard strip 166 carried by a bracket 167 fastened to the frame, as indicated at 168, Fig. 4, is disposed adjacent to the periphery of the table in suitable spaced relation to the guard strip 164. The guard strip 166 has mounted lengthwise thereon a pair of rods 169, which, together with the rods 165 present surfaces of small area to the surfaces of the containers which come into contact with said rods, to thereby reduce the frictional engagement of the containers with the guard strips to a minimum.

The guards 164, 166 are arranged substantially parallel, as shown in Fig. 4, being spaced a sufficient distance apart to allow the free passage of a container between the rods 165, 169.

The guard strips 164, 166 direct the containers along their path of travel on the table 111 toward one end of a timing element 171 comprising a screw, the thread 172 of which has in increasing lead and an increasing thickness, preferably rim-hollowed or doubled, to save metal, as shown at 173.

The screw 171 is rotatably mounted in bearings 174, 175 formed on the bracket 156 in the manner shown best in Fig. 4, the entrance end of said screw abutting an end of the guard 164.

The bracket 167 has a section arranged substantially parallel to the longitudinal axis of the screw 171, and a portion 177 of this section of the bracket is offset to provide a recess 178 having a wall 179 arranged substantially parallel to the longitudinal axis of the screw 171 and spaced from the periphery of the cylindrical portion of the screw a distance greater than the distance between the guard 166 and the periphery of the cylindrical portion of the screw. The recess 178 extends lengthwise of the screw 171 from a point adjacent the end of the screw at which the containers are delivered to the screw by the table 111 to a point substantially midway the length of the screw.

In addition to the recessed portion 178, the bracket 167 has a portion 180 on which is mounted a guard strip 181. The guard 181 is arranged substantially parallel to the longitudinal axis of the screw 171 and is spaced from the periphery of the cylindrical portion of the screw a distance equal substantially to the distance between the guard 166 and the periphery of the cylindrical portion of the screw. The guard 181 is located at the end portion of the screw 171 from which the containers are discharged onto the conveyor 59, and said guard has rods 182 mounted on the face thereof to provide bearing pieces for the containers in a manner similar to the rods 165 and 169 heretofore described. The guard 181 constitutes a continuation of the guard 166, the ends of said guards being spaced apart by the recess 178.

Within the recess 178, and normally disposed with its front face in alignment with the front face of the guards 166 and 181, is a guard 183 having rods 184 mounted on its front face to provide bearing pieces in a manner similar to the rods 165, 169 and 182. Coil springs 185, which are put under compression when the guard is moved in a direction away from the periphery of the cylindrical portion of the screws 171, are interposed between the guard 183 and the wall 179 of the recess 178, said springs being mounted on pins or studs 186 in the manner shown in Fig. 4. By means of this arrangement the guard 183 is normally held in an extended position, but will readily move outwardly against the pressure of the springs 185 when pressure is applied to its face facing the screw 171. The guard 183 thus provides a pressure relief means for allowing proper positioning of each container in the space provided therefor between the screw thread 172 as the containers are fed by the table 111 toward the screw 171.

Since the bracket 167 and the guards 181 and 183 extend obliquely across the path of travel of the studs 66 of the chain 51, the bracket 167 is formed with an elongated slot 187, and the guards 181 and 183 are composed of upper and lower spaced apart complementary sections, respectively, as shown in Fig. 5. The slot 187 and the space between the upper and lower sections of the guards 181 and 183 are of a width greater than the maximum diameter of the studs 66 so as to permit free passage of the studs therethrough. It is to be noted that the inner portion of the screw 171 terminates at a point adjacent to the lower end of the conveyor frame so that the containers are passed from the table 111 to the conveyor 50 directly and without other transfer.

Suitable mechanism is provided for driving the moving members. For example, an end of the screw 171 has mounted thereon a gear 191 which meshes with a gear 192 fixed to a shaft 193 supported by bearings 194. Also mounted on shaft 193 is a bevel gear 195 which meshes with a bevel gear 196 fixed to the upper end of the shaft 151. Mounted on the lower end of the shaft 151 is a bevel gear 197 which meshes with a bevel gear 198 fixed to a shaft 199 rotatable in bearings 200 and 201. The outer end of the shaft 199 has a sprocket 202 mounted thereon. Mounted on shaft 68 is a sprocket 203. A chain 204 travels around the end sprockets 202 and 203 and is guided and supported by intermediate sprockets 205, 206, 207, 208 and 209, mounted respectively on the shafts 94, 95, 96, 97, and 98, heretofore referred to.

The chain 204 is driven from the valve turret shaft 32 by the following mechanism: As shown in Figs. 1, 6, 7 and 9, fixed to shaft 32 is a gear 211 which meshes with a gear 212 keyed to shaft 213 mounted in bearings 214. Shaft 213 has a bevel gear 215 keyed thereto which gear meshes with a bevel gear 216 fixed to shaft 68 heretofore described. Thus rotation imparted to the valve turret shaft 32 by gear 43 is transmitted to the shaft 68 on which are mounted the two sprockets 52 and 203 and in this manner the conveyor chain 51, the table 111 and the screw 171 are simultaneously operated.

In operation, after the containers 220 have been filled and capped, they are deposited by any suitable means in an upright position on the table 111. The containers are then arranged in a single file on the table between the guards or guide members 164, 166 and are carried by the table in the direction of the arrow 221, Fig. 4 toward the screw 171, the successive containers being normally in contact with each other. Each container 220 as it moves toward the receiving end of the screw 171 is separately engaged by the screw thread 172 and, due to the increasing lead of said thread as the file advances and is opened, is spaced from the adjacent containers. In the event that a container is caught between the guard 183 and the periphery of the screw thread 172 at the receiving end of the screw 171, the guard 183 will be moved outwardly away from the periphery of the screw 171, compressing the coil springs 185, and as the container is advanced by the screw it will be rotated or rolled along until the container falls in proper position between the screw thread, whereupon, the coil springs 185 will return the guard 183 to its normal position. The containers are confined with fitting closeness between the main body of the screw 171 and the opposing sides of the track provided by guards 183 and 181, so that the containers are moved by the screw thread 172 lengthwise of the screw towards the conveyor.

The horizontal portion 114 of the conveyor is so arranged with respect to the discharge end of the screw 171, that each container is fed by the screw 171 onto the supporting rods 127 and 128 of the conveyor trackway between two studs 66 of the chain 51 when the studs move through the slotted portion 187 of the bracket 167 and guard 183. When a container passes from the end of the screw thread 172 it is engaged by the stud 66 which is behind it, and the stud propels the container forwardly toward the inclined portion 112 of the conveyor. Thus the rotation of the screw 171, the pitch of the screw thread 172, and the travel of the chain 51 are so related that each container is introduced into the space provided therefor between the studs 66 in timed relation to the movement of the studs past the inner end of the screw 171. In this way the containers are passed to the conveyor directly and without other transfer.

The studs 66 propel the containers in an upright position up the inclined portion 112 and across the horizontal portion 113 of the conveyor directly over the feed valve 21. The containers are then directed by the trackway downwardly of the vertical section 115 of the conveyor, and as the containers pass through the arcuate section of the conveyor adjacent to the sprocket 54, the containers turn forwardly onto their sides and rest upon the studs 66 which are disposed below them. The containers are carried down the vertical portion 115 of the conveyor in a substantially horizontal position with the longitudinal axis of the studs 66, as shown by dotted lines in Fig. 8. Thus, from the point at which the containers are transferred to the conveyor by the feed screw 171 to a point above the feed valve 21, the containers are propelled by the studs 66 of the conveyor chain 51, and during the travel of the containers down the vertical portion 115 of the conveyor the containers rest upon or are supported by the studs and are lowered thereby.

The movement of the chain 51 in a downward vertical direction is synchronized with the rotation of the feed valve turret 31, so that the container supporting surface 35 of a pocket 33 will align substantially with the upper surface of a stud 66, at the point said surfaces cross a line passing horizontally through the center of the turret shaft 32 as shown in Fig. 15. Furthermore, the construction and arrangement of the oblique surface 134 of the member 131 is such that the container being lowered by the stud 66 of the chain engages the surface 134 and rolls down said surface gradually or at such speed that the container rolls off the end of the stud and rolls onto the supporting surface 35 of the pocket when the surfaces are substantially aligned as has been heretofore described. It will thus be noted that when the container moves obliquely across the conveyor in a downward direction the container will be delivered on its side into a pocket of the turret without being dropped into the pocket.

It will furthermore be noted that the vertical section 115 of the conveyor is disposed tangentially with respect to the periphery of the feed valve turret 31 and is arranged to convey containers rectilinearly downwardly in the same general direction as the direction in which the container supporting surfaces 35 of the pockets 33 of the valve turret 31 move past the inlet opening 26 of the feed valve so as to insure a smooth unbroken movement of the containers when the containers are transferred from the conveyor to the feed valve.

The disposition of the member 131 relative to the feed valve, and the manner in which the movement of the chain 51 in a downward vertical direction is synchronized with the rotation of the feed valve turret 31, is such that each container is delivered on its side into a pocket. The member 131 thus constitutes means for intercepting a container carried by the conveyor and for gradually introducing the container into a pocket 33 of the turret whereby the container is transferred without shock or injury to the supporting surface 35 of the pocket which is moving downwardly past the inlet opening 26. Thus the mechanism is so constituted and arranged that the containers are handled gently from the time said containers are deposited on the table 111 until the time the containers are delivered to the cooker 11, thereby avoiding breakage and undue shock thereto.

In actual practice it has been found that the embodiment of the present invention in a pressure cooker eliminates the breakage difficulty experienced with glass containers, whereas if the glass containers are introduced into the feed valve and allowed to fall directly onto the floor of the pocket, they frequently break.

An advantage of the construction here disclosed is that it provides a direct transfer of the containers from the table 111 onto the conveyor 50, and a direct transfer of the containers from the conveyor into the feed valve pockets without any free gravitative fall of the containers at the transfer points, which might result in chipping and cracking the containers, and possibly interfering with the proper operation of the machine.

While in the drawings, by way of example, the feed mechanism of the present invention has been shown as adapted for cooperation with a continuous pressure cooker, it will be apparent that the same may equally well be utilized in connection with other types of cookers as will be obvious to those versed in the art.

What I claim and desire to protect by Letters Patent is:

1. A container feeding mechanism comprising a rotatable member having a pocket in its periphery for receiving a container therein, means for moving a container in a vertical path substantially tangent to the periphery of said rotatable member comprising a trackway having guide rails for guiding a container for downward movement under its own weight, a single endless chain arranged alongside the trackway opposite the rotatable member and movable lengthwise of said trackway, a plurality of studs carried by said chain, said studs projecting laterally from the chain toward that side of the trackway which is tangent to the periphery of the rotatable member and extending transversely across the trackway for controlling the downward movement of a container for registering the container with the pocket in said rotatable member, and a rigid transfer member having a surface disposed obliquely to the direction of travel of the container in a trackway and on either side of said stud for intercepting the container resting on a stud and for causing the containers to roll laterally along said stud and for transferring each container into the pocket of said rotatable member as the leading wall of said pocket moves downwardly in unison with said stud.

2. A container feeding mechanism comprising a member mounted for rotation about a horizontal axis, said member having a pocket in its periphery for receiving a container therein, means for moving a container in a straight line vertically downwardly in a path tangential to the periphery of said rotatable member comprising a trackway having a slot formed lengthwise in a side thereof opposite said rotatable member, guide rails arranged longitudinally of the trackway for guiding a container for gravitational movement therealong, a single endless chain arranged on the outside of the trackway, a plurality of studs carried by said chain, said studs projecting laterally from the chain and extending through said slot, each said stud being arranged to support a container thereon during movement thereof for registering the container with the pocket in the periphery of said rotatable member, and a non-flexing transfer member having a surface disposed on either side of the path of movement of said stud and obliquely to the direction of travel of the container on said stud for intercepting the container and for transferring the container from said trackway into the pocket of said rotatable member.

3. A container feeding mechanism comprising a rotatable member having a pocket in its periphery for receiving a container therein, means for moving a container downwardly at the periphery of said rotatable member comprising a trackway having rails for guiding a container, a single endless chain arranged alongside the trackway and movable lengthwise thereof, a plurality of studs carried by said chain and extending across the trackway for causing a container to move lengthwise thereof and permitting the containers to move laterally thereof toward said rotatable member, means for providing relative motion between the chain and said rotatable member whereby a container is presented in registration with the pocket of said rotatable member, and a rigid transfer member having a slotted surface disposed obliquely to the direction of travel of the container in the trackway for intercepting the container and for transferring the same into the pocket of said rotatable member.

4. A feed mechanism for cylindrical containers comprising a trackway having a slot formed lengthwise in a side wall thereof and an opening in its opposite side wall for the discharge of containers from said trackway, a rigid guide member for deflecting containers from said trackway and out of the discharge opening in said opposite side wall thereof, a single endless chain arranged on the outside of the trackway and extending lengthwise thereof, a plurality of studs carried by said chain substantially in uniform spaced apart relation throughout the length of the chain, said studs projecting laterally from the chain and extending through said slot and terminating within said trackway and being at all times transverse to the axis of the cylindrical containers conveyed for effecting single line contact between said container and said studs during movement of the containers within the trackway as well as during their deflection therefrom by said guide member, and means mounted on the trackway for supporting and guiding the chain.

5. A container feeding mechanism comprising a rotatable member having a container receiving pocket in its periphery, said pocket having a surface for supporting a container lying on its side, means for rotating said member so as to present the container supporting surface of said pocket in a downwardly moving direction, a conveyor having a horizontal section for receiving and conveying containers in an upright position above said member and having a vertical section for conveying containers lying on their sides rectilinearly downwardly toward the periphery of said rotatable member in the same general direction as the direction in which the container supporting surface of said pocket moves, said conveyor including an endless single chain guided for movement at one side wall of said conveyor and having spaced studs extending therefrom into said conveyor for controlling the movement of containers therealong, and a non-flexing guide member slotted to permit passage of said studs whereby the sides of said guide member obstruct the containers for transferring the containers from the conveyor onto the container supporting surface of said pocket smoothly and without shock or injury to the container.

6. A container feeding mechanism comprising a member mounted for rotation about a horizontal axis, said member having a pocket in its periphery, said pocket having a surface for receiving and supporting a container lying on its side, means for rotating said member so as to present the container supporting surface of said pocket in a downwardly moving direction at one side of the horizontal axis of said member, a container carrier arranged for conveying containers in an upright position above said member and for then conveying containers lying on their sides rectilinearly downwardly toward the periphery of said rotatable member in the same general direction as the direction in which the container supporting surface of said pocket moves past the horizontal axis of said member, said carrier including horizontal and vertical trackways and a single endless chain guided for movement lengthwise and at one side thereof, a plurality of spaced studs on said chain extending into said trackways for controlling movement of the containers therealong for registration with the pocket of said member and a rigid guide member having parallel container engaging surfaces straddling the path of movement of said stud for intercepting a container on the carrier and for causing the container to roll lengthwise of the stud associated therewith and toward the pocket of said member whereby the container is delivered onto the supporting surface of said pocket smoothly and without shock or injury to the container.

7. A feed valve comprising a valve casing having an inlet, a rotatable valve body within said casing, said inlet being formed in the side wall of said casing with the center of the inlet substantially in alignment with a horizontal line passing through the axis of rotation of said valve body, a pocket formed in the periphery of said valve body, said pocket having a downwardly moving surface for supporting a container delivered to the pocket on its side, a conveyor for conveying a container toward said feed valve, said conveyor having a section in which the container is maintained in an upright position and a section which extends past the inlet in which the container is disposed on its side, a single strand flexible element guided for movement adjacent that wall of the conveyor which is opposite said valve body and casing, container engaging studs on said flexible element and extending into said conveyor for controlling movement of the containers therein and rigid means adjacent said inlet and traversing said conveyor on either side of the path of movement of said studs for intercepting a container carried by said conveyor and for gradually introducing the container through said inlet to said pocket.

8. An apparatus for processing food products packed in containers comprising, a chamber in which the containers are subjected to processing mechanism for feeding containers to said chamber comprising a casing having an inlet and an outlet, said outlet communicating with said chamber, a turret rotatable in said casing, said turret having a pocket therein adapted to be presented to said inlet during rotation of said turret for receiving a container, means for feeding a container to said pocket comprising a trackway having a slot formed lengthwise in a side thereof, guide rails arranged longitudinally of the trackway and disposed at one side of the slot for supporting and guiding the container, a single endless chain disposed on the outside of the trackway, a plurality of studs carried by said chain, said studs projecting laterally from the chain and extending through said slot for controling the movement of the container within the trackway, and a non-flexing transfer member having an arcuate surface disposed obliquely to the travel of the container on said guide rails, said transfer member extending from the guide rails to one marginal edge of the inlet of said casing and being slotted to provide parallel portions at either side of the path of movement of said studs and arranged to intercept the container on the trackway and to guide the same through said inlet and into the pocket of said turret.

9. A container feeding mechanism comprising a member mounted for rotation about a horizontal axis, said member having a pocket in its periphery, said pocket having a surface for receiving and supporting a container, means for rotating said member so as to present the container supporting surface of said pocket in a downwardly moving direction at a transfer point disposed at one side of the horizontal axis of said member, a conveyor extending tangentially of and downwardly past the periphery of said rotatable member for conveying a container in the same general direction as the direction in which the container supporting surface of said pocket moves past said transfer point, and a stationary non-flexing member having a laterally inclined container engaging surface adjacent said transfer point and arranged obliquely to the direction of travel of the container on said conveyor, said surface intercepting the container on said conveyor at said transfer point for gradually deflecting the container laterally toward the pocket of said rotatable member so as to insure a smooth unbroken movement of the container onto the container supporting surface of said pocket.

10. An article feeding mechanism comprising a casing having an inlet opening in its side, a turret rotatable within said casing about a horizontal axis arranged substantially in horizontal alignment with the center of said inlet opening, said turret having a pocket in its periphery arranged to be presented to said inlet opening upon rotation of said turret, a conveyor arranged to convey articles in a substantially vertical path extending tangentially of the periphery of said turret and in the direction of rotation of the turret for registration of a said article on the conveyor with the pocket of the turret when said pocket is presented to said inlet opening at an article transfer point disposed at one side of said turret axis, and fixed non-flexing means arranged obliquely of said conveyor and terminating substantially tangential to said casing at one margin of said inlet opening, said fixed means having an inclined container engaging surface thereon for intercepting an article carried by said conveyor at said transfer point and for gradually causing the article to move downwardly and laterally along said surface and through said inlet opening into said turret pocket, whereby the article is transferred from the conveyor to the turret pocket by a smooth unbroken movement.

11. An article feeding mechanism comprising a turret rotatable about a horizontal axis, said turret having a series of pockets formed in the periphery thereof for the reception of articles, a conveyor disposed in proximity to the periphery of said rotatable turret and arranged to convey successive articles rectilinearly in a substantially vertical direction tangentially of the periphery of said turret, means for providing relative motion between the conveyor and said turret whereby the articles are successively presented by the conveyor into registration with the pockets of said turret at an article transfer point, and a fixed member extending tangentially of said rotatable member and obliquely across said conveyor at said transfer point, said fixed member having an inclined rigid article engaging surface thereon for intercepting the articles carried by said conveyor and for gradually introducing said articles into the successive pockets of said turret as the pockets move past a horizontal position at one side of the axis of rotation of said turret.

12. A container feeding mechanism comprising a feed valve having a casing formed with spaced inlet and outlet openings, a valve turret mounted within said casing and rotatable about a horizontal axis, the center of said inlet opening being disposed substantially in alignment with a plane extending horizontally of the axis of said valve turret, said valve turret having peripheral pockets therein for successively receiving containers through said inlet opening, each pocket having a container supporting surface moving downwardly past said inlet opening during rotation of said valve turret, the inner wall surface of said casing between said inlet and outlet openings retaining the containers within their respective pockets, and fixed guide means for successively introducing containers into said pockets through said inlet opening as the pockets descend past the inlet opening at a container transfer point where the containers are successively and gradually delivered onto the downwardly moving surfaces of the valve pockets by a laterally inclined container engaging surface of said fixed guide means in a smooth unbroken downward and lateral movement of the containers, said stationary means comprising a vertical chute terminating in a laterally inclined fixed container guide member secured to said valve casing adjacent the lower edge of said inlet opening below the horizontal plane of the axis of said valve turret, in substantially tangential alignment with said inner wall surface of said casing between said inlet and outlet openings thereof.

ALBERT R. THOMPSON.

REFERENCES CITED

The following references are of record in the file of this patent:

UNITED STATES PATENTS

| Number | Name | Date |
|---|---|---|
| 522,414 | Holden | July 3, 1894 |
| 1,018,398 | Nishida | Feb. 20, 1912 |
| 1,297,569 | Johnson | Mar. 18, 1919 |
| 1,402,487 | Fooks | Jan. 3, 1922 |
| 1,418,572 | Hoyt et al. | June 6, 1922 |
| 1,580,193 | Fooks | Apr. 13, 1926 |
| 1,808,017 | Chapman | June 2, 1931 |
| 1,952,418 | Chapman | Mar. 27, 1934 |
| 2,236,100 | Karnopp | Mar. 25, 1941 |
| 2,326,165 | Pelosi | Aug. 10, 1943 |
| 2,335,588 | Fox | Nov. 30, 1943 |
| 2,379,713 | Hohl | July 3, 1945 |